United States Patent
Gao et al.

(10) Patent No.: US 10,110,557 B2
(45) Date of Patent: Oct. 23, 2018

(54) FTP APPLICATION LAYER PACKET FILTERING METHOD, DEVICE AND COMPUTER STORAGE MEDIUM

(71) Applicant: ZTE Corporation, Shenzhen, Guangdong (CN)

(72) Inventors: Yonggang Gao, Shenzhen (CN); Juan Li, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 187 days.

(21) Appl. No.: 14/910,544

(22) PCT Filed: Jun. 10, 2014

(86) PCT No.: PCT/CN2014/079625
§ 371 (c)(1),
(2) Date: Mar. 17, 2016

(87) PCT Pub. No.: WO2014/173365
PCT Pub. Date: Oct. 30, 2014

(65) Prior Publication Data
US 2016/0212096 A1 Jul. 21, 2016

(30) Foreign Application Priority Data
Aug. 20, 2013 (CN) .......................... 2013 1 0364450

(51) Int. Cl.
*H04L 29/06* (2006.01)
*H04L 29/08* (2006.01)

(52) U.S. Cl.
CPC .......... *H04L 63/02* (2013.01); *H04L 63/0227* (2013.01); *H04L 63/0236* (2013.01);
(Continued)

(58) Field of Classification Search
USPC ............ 726/1, 2, 21, 36; 713/150, 163, 181; 380/255, 264, 276
See application file for complete search history.

(56) References Cited

U.S. PATENT DOCUMENTS 7,234,161 B1   6/2007   Maufer
7,391,768 B1   6/2008   Samprathi
(Continued)

FOREIGN PATENT DOCUMENTS

CN    1469591 A    1/2004
CN    1555170 A    12/2004
(Continued)

OTHER PUBLICATIONS

International Search Report in international application No. PCT/CN2014/079625, dated Sep. 2, 2014, 2 pgs.
(Continued)

*Primary Examiner* — Sharif E Ullah
(74) *Attorney, Agent, or Firm* — Cooper Legal Group, LLC (57) ABSTRACT

Disclosed is a method for Application Specific Packet Filter (ASPF) of a File Transfer Protocol (FTP), including the following steps: when a Transmission Control Protocol (TCP) connection of an FTP control channel is established, a first TCP Synchronous (TCP SYN) packet sent by a client is obtained and forwarded to an FTP server; it is detected whether a response packet from the FTP server is a TCP Synchronize-Acknowledgment (SYN+ACK) packet, and if not, the response packet is discarded; it is detected whether a response packet from the client is an ACK TCP packet, and if not, the response packet is discarded; and a data flow table is created to record and update an FTP state. A device for ASPF of a FTP is also provided. The method and device can
(Continued)

avoid and stop the attacks from the FTP application layer, and ensure safe and reliable transmission of an FTP service.

3 Claims, 7 Drawing Sheets

(52) U.S. Cl.
CPC ........ *H04L 63/0254* (2013.01); *H04L 63/083* (2013.01); *H04L 63/20* (2013.01); *H04L 67/06* (2013.01); *H04L 69/16* (2013.01)

(56) References Cited

U.S. PATENT DOCUMENTS

| | | | | |
|---|---|---|---|---|
| 9,807,248 | B2* | 10/2017 | Wei ........................ | H04M 15/66 |
| 2002/0080771 | A1* | 6/2002 | Krumel ................... | H04L 29/06 370/352 |
| 2002/0133586 | A1* | 9/2002 | Shanklin ................. | H04L 43/00 709/224 |
| 2004/0153669 | A1 | 8/2004 | Yang | |
| 2010/0161741 | A1 | 6/2010 | Jiang | |
| 2010/0235902 | A1 | 9/2010 | Guo | |
| 2011/0225306 | A1* | 9/2011 | Delsesto ........... | H04L 29/12896 709/227 |
| 2012/0278492 | A1 | 11/2012 | Jiang | |
| 2013/0031201 | A1* | 1/2013 | Kagan ................... | G01D 4/004 709/213 |
| 2013/0198245 | A1* | 8/2013 | Kagan ..................... | H04L 67/06 707/812 |
| 2013/0230047 | A1* | 9/2013 | Subrahmaniam ... | H04L 47/2441 370/392 |

FOREIGN PATENT DOCUMENTS

| | | |
|---|---|---|
| CN | 101764799 A | 6/2010 |
| CN | 101834833 A | 9/2010 |
| CN | 102325016 A | 1/2012 |
| CN | 102333080 A | 1/2012 |

OTHER PUBLICATIONS

English Translation of the Written Opinion of the International Search Authority in international application No. PCT/CN2014/079625, dated Sep. 3, 2014, 8 pgs.

Stephen Northcutt et al: "Stateful Firewalls" In: Inside Network Perimeter Security1, Apr. 3, 2005 (Apr. 3, 2005),Sams Publishing, XP055222883,ISBN: 978-0-672-32737-7 pp. 55-86, mailed on Apr. 3, 2005.

Postel J Reynolds Isi J: "File Transfer Protocol (FTP); rfc959.txt",5. JCT-VC Meeting; 96. MPEG Meeting; Mar. 16, 2011-Mar. 23, 2011; Geneva; (Joint Collaborative Team on Video Coding of ISO/IEC JTC1/SC29/WG11 and ITU-T SG.16 ); URL:http:/wftp3.itu.int/av-arch/jctvc-site/, Internet Engineering Task Force, IETF, CH, Oct. 1985 (Oct. 1985), XP0150Q6955,ISSN: 0000-0003, mailed on Oct. 1985, 70 pgs.

Supplementary European Search Report in European application No. 14788037.1, dated Aug. 3, 2016, 9 pgs.

* cited by examiner

FTP APPLICATION LAYER PACKET FILTERING METHOD, DEVICE AND COMPUTER STORAGE MEDIUM

TECHNICAL FIELD

The present disclosure relates to a method for implementing Application Specific Packet Filter (ASPF) of File Transfer Protocol (FTP) service and particularly to an FTP-based ASPF method and device and a computer storage medium.

BACKGROUND

The File Transfer Protocol (FTP) is one of the protocols in a Transmission Control Protocol/Internet Protocol (TCP/IP) group. The protocol, which is a basis of Internet file transmission, consists of a series of specification documents and aims to improve sharing of a file and enable a storage medium to transmit data to a user transparently, reliably and efficiently. Simply put, the FTP implements copying between two computers. A process of copying a file in a remote computer to a local computer is called "to download" the file while a process of copying a file in a local computer to a remote computer is called "to upload" the file. In the TCP/IP, the number of a standard command TCP port of the FTP is 21, and a Positive Port is 20. The FTP uses two TCP connections to transmit one file.

Generally, a control connection is established by a client and a server. The server opens a well-known port (21) for the FTP passively and waits for a connection to the client, while the client opens the TCP port 21 positively to create the connection. The control connection always waits for communication between the client and the server. The connection enables a command to transmit from the client to the server and to return a response from the server. Since the command is generally entered by a user, a service type of the IP for the control connection is to "maximally reduce a delay." A data connection is established every time a file is transmitted between the client and the server. Since the connection is used for transmission, the IP serves for the data connection to "maximally improve the throughput."

With the popularization of computer technologies and network technologies, more and more attention is being paid to the problem of network security, and it is of more and more importance to transmit a file safely and reliably based on the FTP. As a security mechanism for controlling FTP file transmission, a firewall has become the first choice of safe FTP transmission. A firewall aims to establish a barrier between a trusted network and a non-trusted network and implement a corresponding security strategy. A firewall applied in a network is an extremely effective network security means. Generally, a firewall is implemented by a packet filter technology.

The core of the packet filter technology is to define an Access Control List (ACL) rule to filter a data packet. For a data packet that needs to be forwarded, a packet filter firewall obtains header information (including a protocol number of a protocol of an upper layer carried on an IP layer, and a source address, a target address, a source port and a target port of the data packet and so on) of the data packet first, then compares the header information with the ACL rule set by a user, and processes the data packet (allowing the data packet to pass or discarding the data packet) according to a comparison result.

The advantages of the packet filter technology include that filtering only occurs on a network layer, and thus processing is rapid. Further, there is little impact on device performance especially in the conditions of moderate traffic, and a modest size of the configured ACL. Furthermore, the packet filter technology is implemented transparently for an application of an upper layer and a user, and it is unnecessary to install specific software on a user's host. Although the packet filter technology has the above advantages, since a packet filter firewall only checks and filters on a network layer, but does not parse and detect the content of an application layer of a packet, some threats from the application layer, such as a user login attack in an FTP application and so on, can be hardly prevented.

SUMMARY

The present disclosure mainly aims to provide a method and device for an ASPF of FTP, and a computer storage medium, so as to solve the technical problem that some threats from an application layer can be hardly prevented in the traditional art.

To this end, an embodiment of the present disclosure provides a method for ASPF of the FTP, which includes that:

when a TCP connection of an FTP control channel is established, a first TCP Synchronous (TCP SYN) packet sent by a client is obtained and forwarded to an FTP server;

it is detected whether a response packet from the FTP server is a TCP Synchronize+Acknowledgment (SYN+ACK) packet, and if not, the response packet is discarded;

if the response packet from the FTP server is a TCP SYN+ACK packet, it is detected whether a response packet from the client is an ACK TCP packet, and if not, the response packet is discarded; and if the response packet from the client is an ACK TCP packet, a data flow table is created to record and update an FTP state.

Preferably, the method may further include that:

when the FTP state indicates successful establishment of the TCP connection, the client is required to send a username to the FTP server;

after the username sent by the client is received, an FTP state recording unit is notified to update the FTP state as USER sent; and the client is required to send a password to the FTP server, wait for an acknowledgement packet from the server and parse whether login is successful;

after a user logs in successfully, the FTP state is recorded as successful establishment of the control channel, the FTP state is updated as successful establishment of the TCT connection for unsuccessful login, and the user is required to perform login verification again.

Preferably, the method may further include that:

content of a PORT command packet in the FTP control channel is parsed, and an IP address and a port of a data channel are obtained;

a dynamic data channel passing rule is established according to the IP address and the port of the data channel so as to allow the two parties to establish the data channel and transmit data while refusing passing of other packets not belonging to the data channel, and after the transmission in the data channel, the dynamic data channel passing rule is deleted.

Preferably, the method may further include that:

contents of a Passive (PASV) command and a response packet thereof are parsed, and an IP address and a port number of a data channel are obtained; and a dynamic data channel passing rule is established according to the IP address and the port number obtained from the response packet of the PASV command to allow data transmission via the IP address and the port.

Preferably, the method may further include that: handshake detection is performed for three times for a TCP packet in the data channel, a TCP interaction process is tracked and detected, a TCP state is recorded, and a data packet not satisfying an interaction protocol is discarded.

An embodiment of the present disclosure further provides a device for ASPF of the FTP, including a TCP three-handshake detection unit and an FTP state recording unit.

The TCP three-handshake detection unit is configured to:

obtain, when a TCP connection of an FTP control channel is established, a first TCP SYN packet sent by a client and forward the same to an FTP server;

detect whether a response packet from the FTP server is a TCP SYN+ACK packet, and if not, discard the response packet; and if the response packet from the FTP server is a TCP SYN+ACK packet, further detect whether a response packet from the client is an ACK TCP packet, and if not, discard the response packet.

The FTP state recording unit is configured to, when the response packet from the client is an ACK TCP packet, create a data flow table to record and update an FTP state.

Preferably, the device may further include:

a username processing unit configured to require, when the FTP state indicates successful establishment of the TCP connection, the client to send a username to the FTP server; and a password processing unit configured to notify, after receiving the username sent by the client, the FTP state recording unit to update the FTP state as USER sent; and require the client to send a password to the FTP server, wait for an acknowledgement packet from the server and parse whether login is successful;

the FTP state recording unit may be further configured to record, after a user logs in successfully, the FTP state as successful establishment of the control channel, update the FTP state as successful establishment of the TCT connection for unsuccessful login, and require the user to perform login verification again.

Preferably, the device may further include:

a parsing unit, configured to parse content of a PORT command packet in the FTP control channel, and obtain an IP address and a port of a data channel;

a filtering rule establishing unit, configured to establish a dynamic data channel passing rule according to the IP address and the port of the data channel so as to allow the two parties to establish the data channel and transmit data while refusing passing of other packets not belonging to the data channel, and after the transmission in the data channel, delete the dynamic data channel passing rule.

Preferably, the parsing unit may be further configured to:

parse content of a PASV command and a response packet thereof, and obtain an IP address and a port number of a data channel; and the filtering rule establishing unit may be further configured to:

establish, according to the IP address and the port number obtained from the response packet of the PASV command, a dynamic data channel passing rule to allow data transmission via the IP address and the port.

Preferably, the device may further include a data channel monitoring unit, configured to perform handshake detection for three times for a TCP packet in the data channel, track and detect a TCP interaction process, record a TCP state, and discard a data packet not satisfying an interaction protocol.

An embodiment of the present disclosure further provides a computer storage medium, in which computer executable instructions are stored. The computer executable instructions are used for executing the above method.

According to the embodiments of the present disclosure, an FTP TCP packet is tracked and detected, it is monitored that establishment of a control channel and a data channel satisfies a TCP three-handshake protocol; and login interaction between a client and a server in an FTP control channel is detected and controlled, thus filtering an attack packet, and a packet not satisfying a login interaction protocol; a PORT command packet, a PASV command and response packet thereof are parsed to obtain an IP address and a port number applied by the data channel, a data channel filtering rule is added dynamically, and a data channel satisfying the rule is allowed to transmit a packet. By means of the above method, an FTP service is tracked, detected, filtered, and monitored comprehensively, thus avoiding an attack for an FTP application layer and ensuring safe and reliable transmission of an FTP service.

DETAILED DESCRIPTION

It should be understood that the specific embodiments described herein are only used for explaining the present disclosure, but are not used for limiting the present disclosure.

Figure 1:
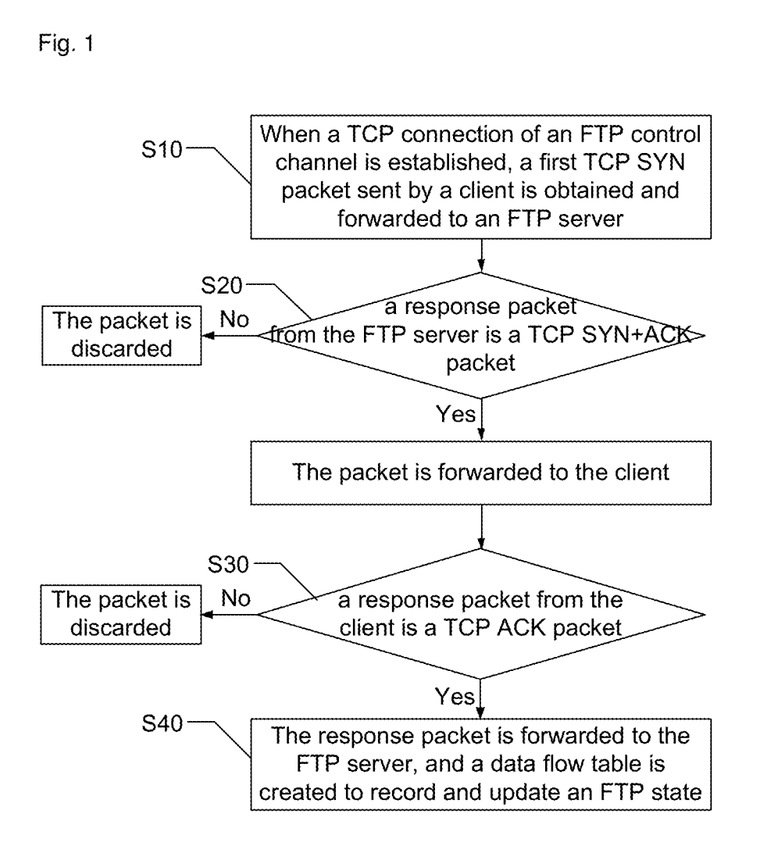
FIG. 1 is a flowchart showing the method for the ASPF of the FTP according to an embodiment of the present disclosure.

The present disclosure provides a method for an ASPF of an FTP. Referring to FIG. 1, according to an embodiment of the present disclosure, the method includes the following steps.

Step 10: When a TCP connection of an FTP control channel is established, a first TCP SYN packet sent by a client is obtained and forwarded to an FTP server.

Step 20: it is detected whether a response packet from the FTP server is a TCP SYN+ACK packet, if not, the response packet is discarded, and otherwise, the response packet is forwarded to the client.

Step 30: it is detected whether a response packet from the client is an ACK TCP packet, if not, the response packet is discarded, and otherwise, the response packet is forwarded to the FTP server.

Step 40: A data flow table is created to record and update an FTP state.

Figure 2:
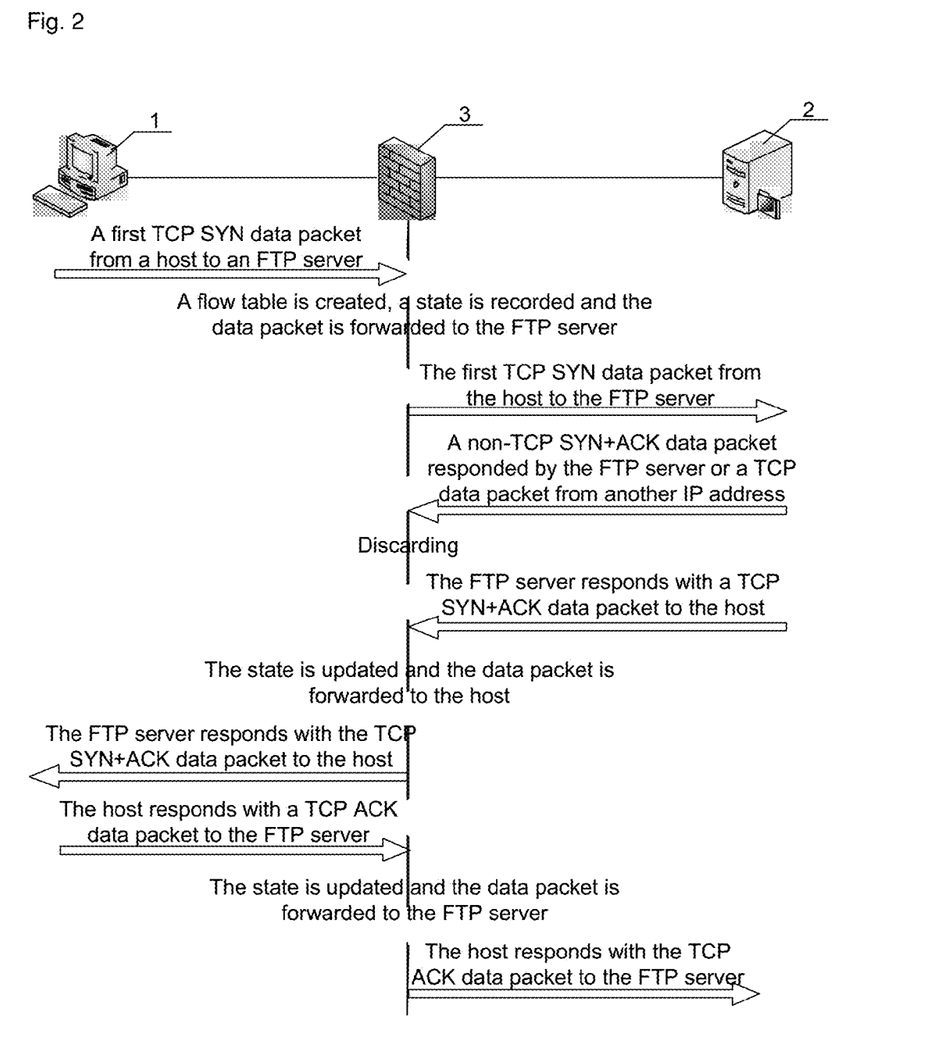
FIG. 2 is a flowchart showing signaling interaction of the method for the ASPF of the FTP as shown in FIG. 1.

Specifically, as shown in FIG. 2, in the embodiment of the present disclosure, when the client 1 sends the first TCP SYN data packet to the FTP server 2 during the process of establishing the FTP control channel, the FTP ASPF device 3 creates the data flow table, records a state, and forwards the TCP SYN data packet to the FTP server 2. If detecting a non-TCP SYN+ACK data packet responded by the FTP server 2 or a TCP data packet from another address, the FTP ASPF device 3 discards the non-TCP SYN+ACK data packet or the TCP data packet. If the FTP server 2 responds with a TCP SYN+ACK data packet, the device 3 forwards the TCP SYN+ACK data packet to the client 1. The FTP ASPF device 3 updates the state of the data flow table, detects whether the response packet from the client 1 is an ACK TCP packet, and if not, discards the response packet, and otherwise, forwards the response packet to the FTP server 2. The FTP ASPF device 3 updates the state of the data flow table (for example, the FTP ASPF device 3 updates the state of the data flow table into TCP_EST, indicating that the FTP state is successful establishment of the TCP connection).

As known to all, an FTP packet is a TCP packet, and a TCP connection of the TCP packet can be only established by three handshakes, so as to use the connection to transmit data. TCP validity of the FTP packet is detected during the three handshakes according to a TCP three-handshake protocol during a process of establishing an FTP control channel in an embodiment of the present disclosure, and a state of an FTP TCP connection during the detection is tracked and recorded by a data flow table to filter and remove those invalid packets which are not matched with TCP protocol interaction, thus filtering an invalid FTP packet and implementing an application specific packet filter of the FTP.

Figure 3:
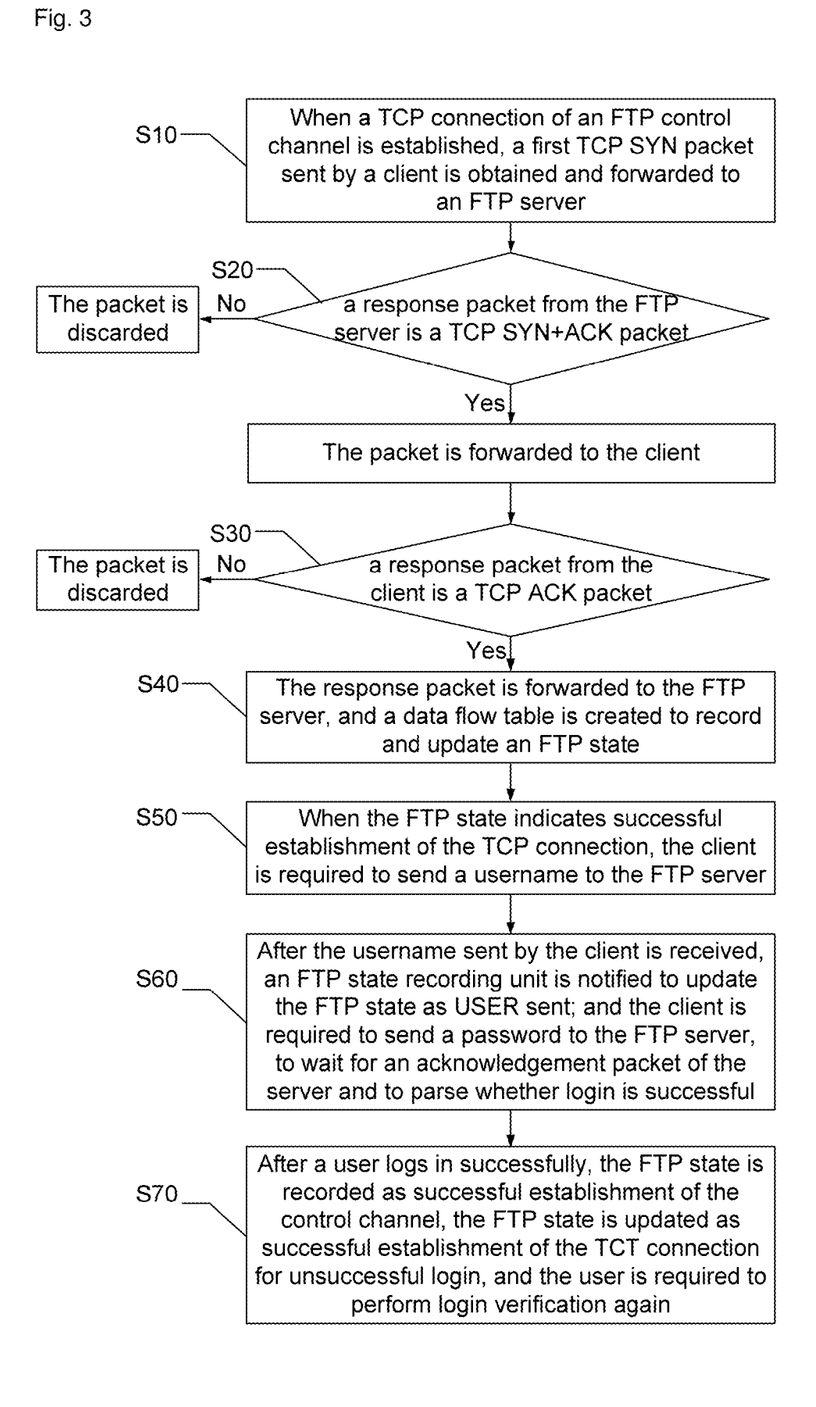
FIG. 3 is a flowchart showing the method for the ASPF of the FTP according to another embodiment of the present disclosure.

Referring to FIG. 3, in an embodiment of the present disclosure, the method further includes the following steps.

Step 50: When the FTP state indicates successful establishment of the TCP connection, the client is required to send a username to the FTP server.

Step 60: After the username sent by the client is received, an FTP state recording unit is notified to update the FTP state as USER sent; and the client is required to send a password to the FTP server, wait for an acknowledgement packet from the server and parse whether login is successful.

Step 70: After a user logs in successfully, the FTP state is recorded as successful establishment of the control channel, the FTP state is updated as successful establishment of the TCT connection for a user with unsuccessful login, and the user is required to perform login verification again.

Figure 4:
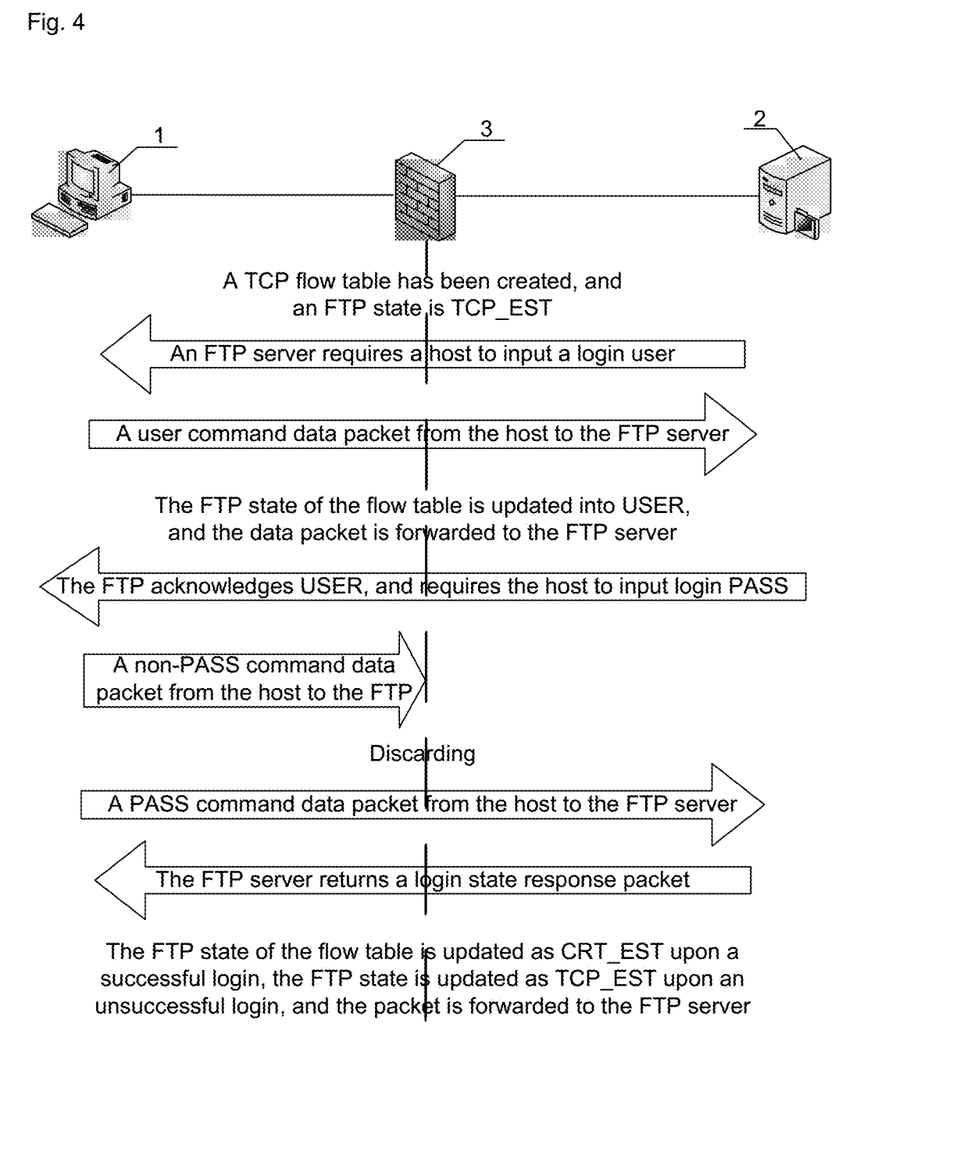
FIG. 4 is a flowchart showing signaling interaction of the method for the ASPF of the FTP as shown in FIG. 3.

Specifically, as shown in FIG. 4, in the embodiment of the present disclosure, after the TCP connection of the FTP control channel is established, the FTP state of the connection is recorded as successful establishment of the TCP connection. At the moment, the control channel between the client 1 and the server 2 has not been completely established and the FTP server 2 needs to verify the validity of the user. The FTP server 2 requires the client to input the username and the password for verification. A connection state of the FTP control channel is recorded and maintained during the login in the FTP server 2 by the client 1. When the FTP state indicates successful establishment of the TCP connection, the FTP ASPF device 3 only allows the client 1 to send the username to the FTP server 2. After the client 1 sends the username, the FTP ASPF device 3 notifies the FTP state recording unit to update the FTP state into USER sent. At the moment, the FTP ASPF device 3 only allows the client 1 to send the password to the FTP server 2. After the user logs in successfully, the FTP ASPF device 3 records the FTP state as successful establishment of the control channel. For a user who does not log in successfully, the FTP ASPF device 3 updates the FTP state as successful establishment of the TCP connection and requires the user to perform login verification again. In the embodiment of the present disclosure, all packets not satisfying the FTP protocol interaction during the FTP connection are refused, thus preventing an external malicious user from occupying and attacking server resources.

Figure 5:
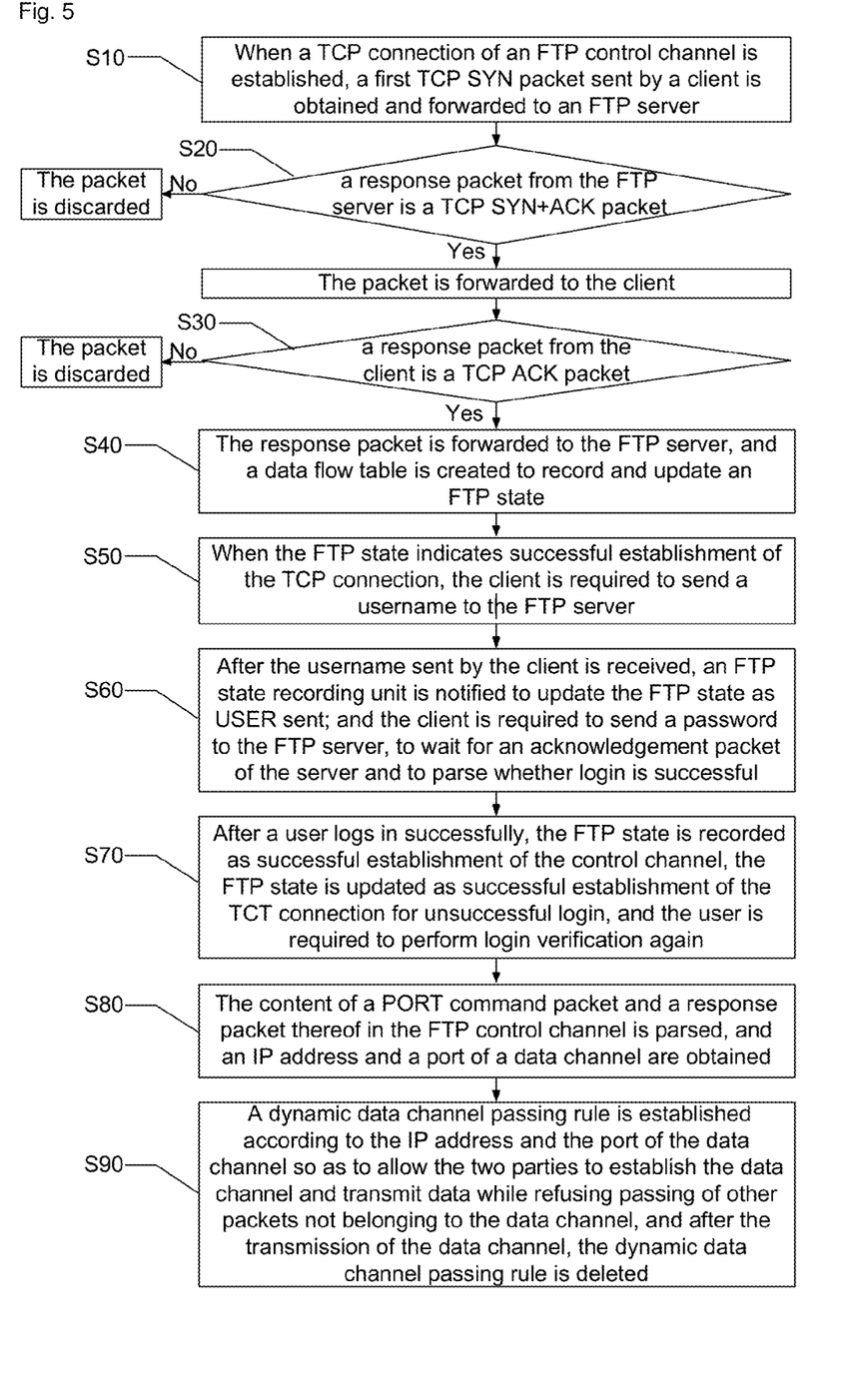
FIG. 5 is a flowchart showing the method for the ASPF of the FTP according to another embodiment of the present disclosure.

Referring to FIG. 5, in an embodiment of the present disclosure, the method may further include the following steps.

Step 80: The content of a PORT command packet in the FTP control channel is parsed, and an IP address and a port of a data channel are obtained.

Step 90: A dynamic data channel passing rule is established according to the IP address and the port of the data channel so as to allow the two parties to establish the data channel and transmit data while refusing passing of other packets not belonging to the data channel, and after the transmission in the data channel, the dynamic data channel passing rule is deleted.

Figure 6:
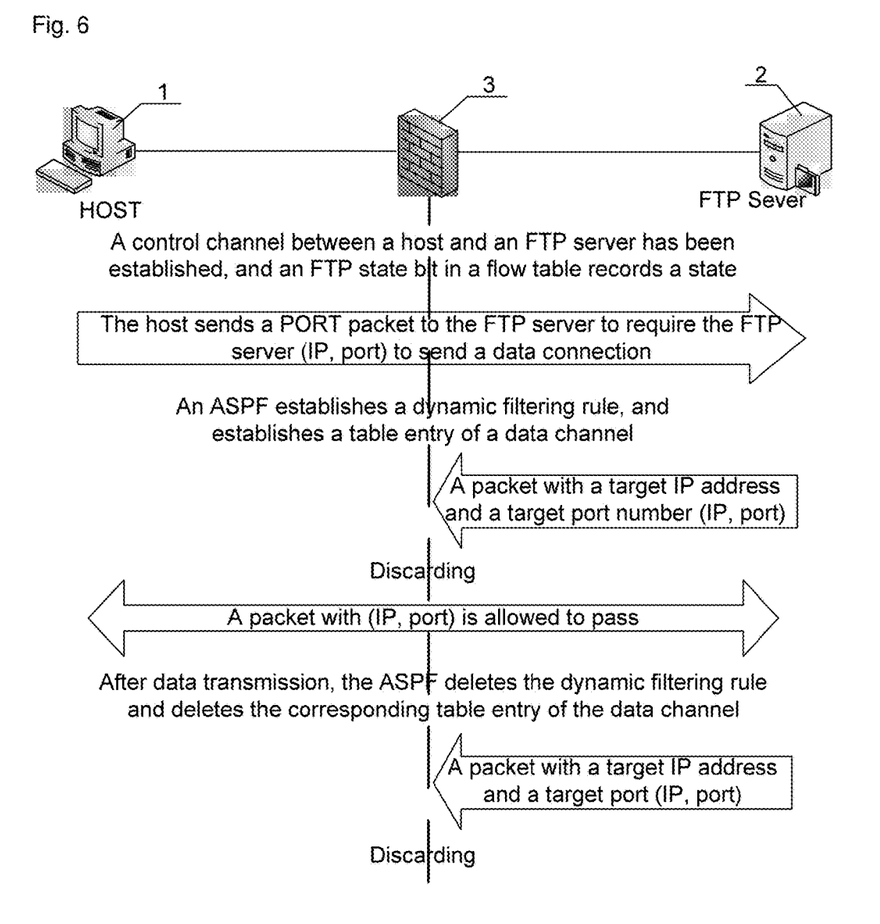
FIG. 6 is a flowchart showing signaling interaction the method for the ASPF of the FTP as shown in FIG. 5.

The data channel passing rule is a dynamic data packet filtering rule in the embodiment of the present disclosure. Specifically, as shown in FIG. 6, the FTP control channel is established formally after the client 1 sends USER and PASS command packets to the FTP server 2, provides a correct username and password, and logs in the FTP server 2 successfully. The FTP ASPF device 3 updates the FTP state as successful establishment of the control channel. After the client 1 sends the PORT packet to the FTP server 2 to negotiate the data channel, the FTP ASPF device 3 parses information in the data channel in the PORT packet, establishes the dynamic data channel passing rule, allows the two parties to establish the data channel and transmit data while refusing passing of other packets not belonging to the data channel, and deletes the dynamic data channel passing rule after the transmission in the data channel. In the embodiment of the present disclosure, the dynamic data channel passing rule may be an ACL or other filtering rules for filtering an invalid data packet.

It is noted that the above embodiment is described in the present disclosure with respect to the PORT. The present disclosure is also applicable to the PASV. In an embodiment of the present disclosure, the method may further include the following steps:

the contents of a PASV command and a response packet thereof are parsed, and an IP address and a port number of a data channel are obtained; and a dynamic data channel passing rule is established according to the IP address and the port number obtained from the response packet of the PASV command to allow data transmission via the IP address and the port.

In an embodiment of the present disclosure, the method may further include the following steps: handshake detection is performed for three times for a TCP packet in the data channel, a TCP interaction process is tracked and detected, a TCP state is recorded, and a data packet not satisfying an interaction protocol is discarded. In the embodiment of the present disclosure, the process in which the data channel monitoring unit 70 performs the handshake detection for three times on the TCP packet in the data channel is substantially the same as the process of performing the handshake detection for three times during the establishment process of the data channel. The embodiment of the present disclosure also detects the validity of the interaction during the three TCP handshakes for the data channel, thereby protecting the accuracy and validity of data transmission and further implementing the ASPF of the FTP.

Figure 7:
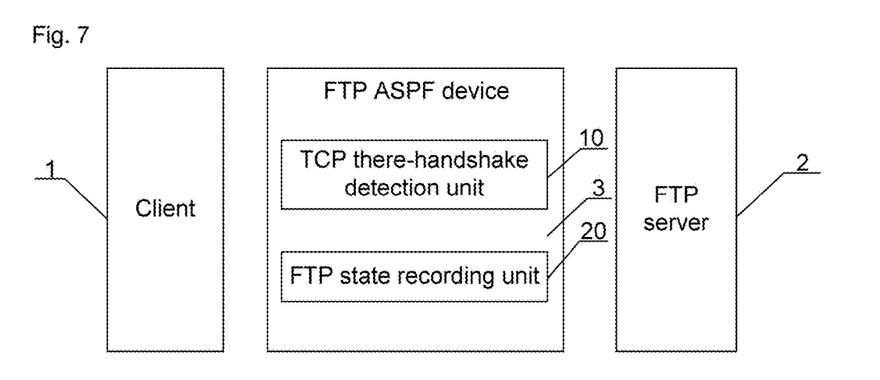
FIG. 7 is a structural diagram illustrating the device for the ASPF of the FTP according to an embodiment of the present disclosure.

The present disclosure further provides a device for an ASPF of an FTP. Referring to FIG. 7, FIG. 7 is a structural diagram illustrating a device for an ASPF of an FTP in an embodiment of the present disclosure. In the present embodiment, the FTP ASPF device 3 includes: a TCP three-handshake detection unit 10 and an FTP state recording unit 20. The TCP three-handshake detection unit 10 is configured to:

obtain, when a TCP connection of an FTP control channel is established, a first TCP SYN packet sent by a client 1 and forward the same to an FTP server 2;

detect whether a response packet from the FTP server 2 is an SYN+ACK TCP packet, if not, discard the response packet; and if yes, forward the response packet to the client 1; and detect whether a response packet from the client 1 is an ACK TCP packet, if not, discard the response packet; and otherwise, forward the response packet to the FTP server 2.

The FTP state recording unit 20 is configured to create a data flow table to record and update an FTP state.

Specifically, in the embodiment of the present disclosure, when the client 1 sends the first TCP SYN data packet to the FTP server 2 during the process of establishing the FTP control channel, the FTP state recording unit 20 creates the data flow table, records a state of the data flow table, and a packet forwarding unit 10 forwards the TCP SYN data packet to the FTP server 2. If detecting a non-TCP SYN+ACK data packet responded by the FTP server 2 or a TCP data packet from another address, the TCP three-handshake detection unit 10 discards the non-TCP SYN+ACK data packet or the TCP data packet. If the FTP server 2 responds with a TCP SYN+ACK data packet, the TCP three-handshake detection unit 10 forwards the TCP SYN+ACK data packet to the client 1. The FTP state recording unit 20 updates the state of the data flow table. The TCP three-handshake detection unit 10 detects whether the response packet from the client 1 is an ACK TCP packet, and if not, discards the response packet, and otherwise, forwards the response packet to the FTP server 2. The FTP state recording unit 20 updates the state of the data flow table (for example, the FTP state recording unit 20 updates the state of the data flow table as TCP_EST, indicating that the FTP state is successful establishment of the TCP connection).

As known to all, an FTP packet is a TCP packet, and a TCP connection of the TCP packet can be only established by three handshakes, so as to use the connection to transmit data. TCP validity of the FTP packet is detected during the three handshakes according to a TCP three-handshake protocol during a process of establishing an FTP control channel in an embodiment of the present disclosure, and a state of an FTP TCP connection during the detection is tracked and recorded by a data flow table to filter and remove those invalid packets which are not matched with TCP protocol interaction, thus filtering an invalid FTP packet and implementing an application specific packet filter of the FTP.

Figure 8:
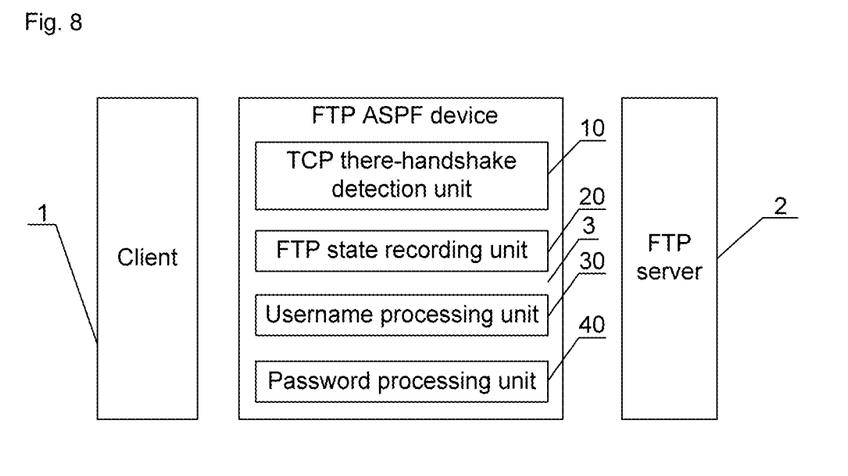
FIG. 8 is a structural diagram illustrating the device for the ASPF of the FTP according to another embodiment of the present disclosure.

Referring to FIG. 8, in an embodiment of the present disclosure, based on the above embodiment, the FTP ASPF device 3 may further include:

a username processing unit 30 configured to require, when the FTP state indicates successful establishment of the TCP connection, the client 1 to send a username to the FTP server 2;

a password processing unit 40 configured to notify, after receiving the username sent by the client 1, the FTP state recording unit 20 to update the FTP state as USER sent; and require the client 1 to send a password to the FTP server 2, to wait for an acknowledgement packet of the server and to parse whether login is successful; and the FTP state recording unit 20 is further configured to record, after a user logs in successfully, the FTP state as successful establishment of the control channel, update the FTP state as successful establishment of the TCT connection for a user with unsuccessful login, and require the user to perform login verification again.

In the embodiment of the present disclosure, after the TCP connection of the FTP control channel is established, the FTP state of the connection is recorded as successful establishment of the TCP connection. At the moment, the control channel between the client 1 and the server 2 has not been completely established and the FTP server 2 needs to verify the validity of the user. The FTP server 2 requires the client to input the username and the password for verification. A connection state of the FTP control channel is recorded and maintained during the login in the FTP server 2 by the client 1. When the FTP state indicates successful establishment of the TCP connection, the username processing unit 30 only allows the client 1 to send the username to the FTP server 2. After the client 1 sends the username, the password processing unit 40 notifies the FTP state recording unit to update the FTP state into USER sent. At the moment, the password processing unit 40 only allows the client 1 to send the password to the FTP server 2. After the user logs in successfully, the FTP state recording unit 20 records the FTP state as successful establishment of the control channel. For a user who does not log in successfully, the FTP state recording unit 20 updates the FTP state as successful establishment of the TCP connection and requires the user to perform login verification again. In the embodiment of the present disclosure, all packets not satisfying the FTP protocol interaction during the FTP connection are refused, thus preventing an external malicious user from occupying and attacking server resources.

Figure 9:
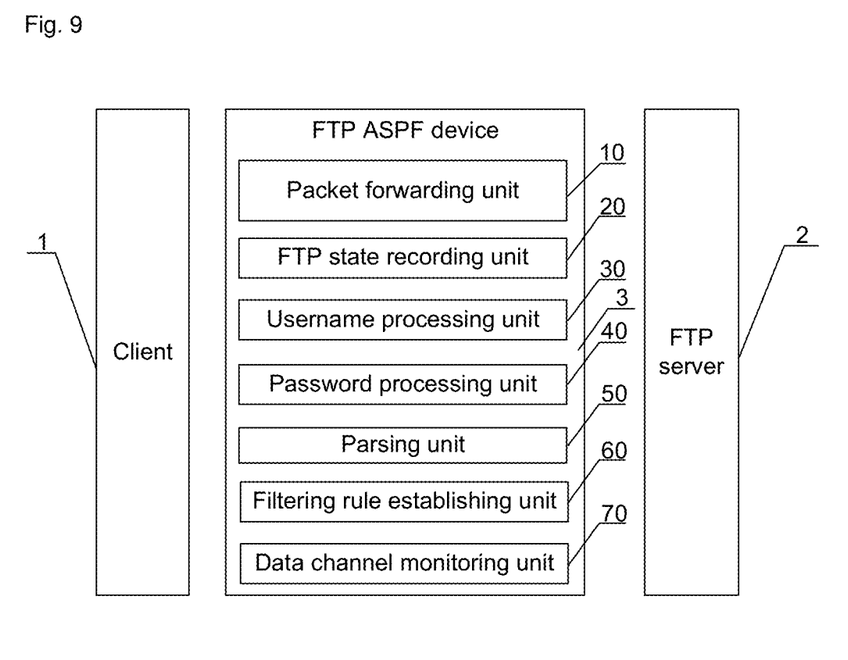
FIG. 9 is a structural diagram illustrating the device for the ASPF of the FTP according to still another embodiment of the present disclosure.

Referring to FIG. 9, in an embodiment of the present disclosure, based on the above embodiment, the FTP ASPF device 3 may further include:

a parsing unit 50, configured to parse the content of a PORT command packet in the FTP control channel, and obtain an IP address and a port of a data channel; and a filtering rule establishing unit 60, configured to establish a dynamic data channel passing rule according to the IP address and the port of the data channel so as to allow the two parties to establish the data channel and transmit data while refusing passing of other packets not belonging to the data channel, and after the transmission in the data channel, delete the dynamic data channel passing rule.

The data channel passing rule is a dynamic data packet filtering rule in the embodiment of the present disclosure. The FTP control channel is established formally after the client 1 sends USER and PASS command packets to the FTP server 2, provides a correct username and password, and logs in the FTP server 2 successfully. The FTP state recording unit 20 updates the FTP state as successful establishment of the control channel. After the client 1 sends the PORT packet to the FTP server 2 to negotiate the data channel, the parsing unit 50 parses information in the data channel in the PORT packet and the filtering rule establishing unit 60 establishes the dynamic data channel passing rule, allows the two parties to establish the data channel and transmit data while refusing passing of other packets not belonging to the data channel, and deletes the dynamic data channel passing rule after the transmission in the data channel. In the embodiment of the present disclosure, the dynamic data channel passing rule may be an ACL or other filtering rules for filtering an invalid data packet.

Further, in an embodiment of the present disclosure, the FTP ASPF device 3 may further include: a data channel monitoring unit 70, configured to perform handshake detection for three times for a TCP packet in the data channel, track and detect a TCP interaction process, record a TCP state, and discard a data packet not satisfying an interaction protocol. In the embodiment of the present disclosure, the process in which the data channel monitoring unit 70 performs the handshake detection for three times on the TCP packet in the data channel is substantially the same as the process of performing the handshake detection for three times during the establishment process of the data channel. The embodiment of the present disclosure also detects the validity of the interaction of the three TCP handshakes for the data channel, thereby protecting the accuracy and validity of data transmission and further implementing the ASPF of the FTP.

It is noted that the above embodiment is described in the present disclosure with respect to the PORT. The present disclosure is also applicable to the PASV. In an embodiment of the present disclosure, the parsing unit 50 is further configured to: parse the contents of a PASV command and a response packet thereof, and obtain an IP address and a port number of a data channel; and the filtering rule establishing unit 60 is further configured to: establish, according to the IP address and the port number obtained from the response packet of the PASV command, a dynamic data channel passing rule to allow data transmission via the IP address and the port.

An embodiment of the present disclosure further provides a computer storage medium, in which computer executable instructions are stored. The computer executable instructions are used for executing the methods of the above embodiments.

The units above may be implemented by a Central Processing Unit (CPU), a Digital Signal Processor (DSP) or a Field-Programmable Gate Array (FPGA) in an electronic device.

Those skilled in the art should understand that the embodiments of the present disclosure may be provided as methods, systems, or computer program products. Thus, the present disclosure may implement a form of hardware, software, or a combination thereof. In addition, the present disclosure may apply a form of a computer program product executed on one or more computer-usable storage media (including, but not limited to a magnetic disk storage device, an optical disk storage device and so on) containing computer-usable program codes.

The present disclosure is described with reference to flowcharts and/or block diagrams of methods, devices (systems) and computer program products according to the embodiments of the present disclosure. It should be understood that each flow and/or block in the flowcharts and/or block diagrams, and combinations of flows and/or blocks in the flowcharts and/or block diagrams, can be implemented by computer program instructions. These computer program instructions may be provided to a processor of a general purpose computer, a dedicated purpose computer, an embedded processor or other programmable data processing devices to produce a machine, such that the instructions executed via the processor of the computer or other programmable data processing devices, create a device for implementing functions specified in one or more flows of the flowcharts or one or more blocks of the block diagrams.

These computer program instructions may also be stored in a computer-readable memory that can direct a computer or other programmable data processing devices to function in a particular manner, such that the instructions stored in the computer-readable memory produce an article of manufacture including an instruction device which implements the functions specified in one or more flows of the flowcharts or one or more blocks of the block diagrams.

These computer program instructions may also be loaded onto a computer or other programmable data processing devices to cause a series of operational steps to be performed on the computer or other programmable devices to produce a process implemented by the computer such that the instructions executed on the computer or other programmable devices provide steps for implementing the functions specified in one or more flows of the flowcharts or one or more blocks of the block diagrams.

The foregoing is only preferred embodiments of the present disclosure, but is not intended to limit the scope of the present disclosure. All equivalent structures or equivalent flow modifications made according to the specification and the content of the accompanying drawings of the present disclosure, or any equivalent structures or equivalent flow modifications applied in other relevant technical fields directly or indirectly are similarly included in the protection scope of the present disclosure.

The invention claimed is:

1. A method for Application Specific Packet Filter (ASPF) of a File Transfer Protocol (FTP), comprising:
   obtaining, when a Transmission Control Protocol (TCP) connection of an FTP control channel is established, a first TCP Synchronous (TCP SYN) packet sent by a client and forwarding the same to an FTP server;
   detecting whether a response packet from the FTP server is a TCP Synchronize+Acknowledgment (SYN+ACK) packet, and in the case that the response packet from the FTP server is not the TCP SYN+ACK packet, discarding the response packet from the FTP server;
   detecting, in the case that the response packet from the FTP server is the TCP SYN+ACK packet, whether a response packet from the client is an ACK TCP packet, and in the case that the response packet from the client is not the ACK TCP packet, discarding the response packet from the client; and
   in the case that the response packet from the client is the ACK TCP packet, creating a data flow table to record and update an FTP state;
   when the FTP state indicates successful establishment of the TCP connection, requiring the client to send a username to the FTP server;
   after the username sent by the client is received, notifying an FTP state recording unit to update the FTP state as USER sent; and requiring the client to send a password to the FTP server, to wait for an acknowledgement packet from the FTP server and to parse whether login is successful;
   after a user logs in successfully, recording the FTP state as successful establishment of the FTP control channel, updating the FTP state as successful establishment of the TCP connection for unsuccessful login, and requiring the user to perform login verification again;
   parsing content of a Positive (PORT) command packet in the FTP control channel, and obtaining an Internet Protocol (IP) address and a port of a data channel;

establishing a dynamic data channel passing rule according to the IP address and the port of the data channel so as to allow the client and the FTP server to establish the data channel and transmit data while refusing passing of other packets not belonging to the data channel, and after transmission in the data channel, deleting the dynamic data channel passing rule;

parsing content of a Passive (PASV) command and a response packet of the PASV command, and obtaining an IP address and a port of a data channel;

establishing, according to the IP address and the port obtained from the response packet of the PASV command, a dynamic data channel passing rule to allow data transmission via the IP address and the port; and performing handshake detection for three times for a TCP packet of the data channel, tracking and detecting a TCP interaction process, recording a TCP state, and discarding transmission of a data packet not satisfying an interaction protocol.

2. A device for Application Specific Packet Filter (ASPF) of a File Transfer Protocol (FTP), comprising a Transmission Control Protocol (TCP) three-handshake detection unit and an FTP state recording unit, wherein the TCP three-handshake detection unit to:

obtain, when a TCP connection of an FTP control channel is established, a first TCP Synchronous (TCP SYN) packet sent by a client and forward the same to an FTP server;

detect whether a response packet from the FTP server is a TCP Synchronize+Acknowledgment (SYN+ACK) packet, and in the case that the response packet from the FTP server is not the TCP SYN+ACK packet, discard the response packet from the FTP server; and in the case that the response packet from the FTP server is the TCP SYN+ACK packet, detect whether a response packet from the client is an ACK TCP packet, and in the case that the response packet from the client is not the ACK TCP packet, discard the response packet from the client; and the FTP state recording unit, when the response packet from the client is the ACK TCP packet, creates a data flow table to record and update an FTP state, wherein the device further comprises:

a username processing unit requires, when the FTP state indicates successful establishment of the TCP connection, the client to send a username to the FTP server; and a password processing unit notifies, after receiving the username sent by the client, the FTP state recording unit to update the FTP state as USER sent; and requires the client to send a password to the FTP server, to wait for an acknowledgement packet from the FTP server and to parse whether login is successful;

wherein the FTP state recording unit records, after a user logs in successfully, the FTP state as successful establishment of the FTP control channel, updates the FTP state as successful establishment of the TCP connection for unsuccessful login, and requires the user to perform login verification again, wherein the device further comprises:

a parsing unit, parses content of a Positive (PORT) command packet in the FTP control channel, and obtains an Internet Protocol (IP) address and a port of a data channel; and a filtering rule establishing unit, establishes a dynamic data channel passing rule according to the IP address and the port of the data channel so as to allow the FTP server and the client to establish the data channel and transmit data while refusing passing of other packets not belonging to the data channel, and after transmission in the data channel, deletes the dynamic data channel passing rule, wherein the parsing unit parses content of a Passive (PASV) command and a response packet of the PASV command, and obtains an IP address and a port of a data channel, wherein the filtering rule establishing unit establishes, according to the IP address and the port obtained from the response packet of the PASV command, a dynamic data channel passing rule to allow data transmission via the IP address and the port, and wherein the device further comprises a data channel monitoring unit, that performs handshake detection for three times for a TCP packet of a data channel, tracks and detects a TCP interaction process, record a TCP state, and discard transmission of a data packet not satisfying an interaction protocol.

3. A non-transitory computer storage medium, computer executable instructions stored therein, wherein the computer executable instructions are configured to execute a method comprising:

obtaining, when a Transmission Control Protocol (TCP) connection of an FTP control channel is established, a first TCP Synchronous (TCP SYN) packet sent by a client and forwarding the same to an FTP server;

detecting whether a response packet from the FTP server is a TCP Synchronize+Acknowledgment (SYN+ACK) packet, and in the case that the response packet from the FTP server is not the TCP SYN+ACK packet, discarding the response packet from the FTP server;

detecting, in the case that the response packet from the FTP server is the TCP SYN+ACK packet, whether a response packet from the client is an ACK TCP packet, and in the case that the response packet from the client is not the ACK TCP packet, discarding the response packet from the client; and in the case that the response packet from the client is the ACK TCP packet, creating a data flow table to record and update an FTP state;

when the FTP state indicates successful establishment of the TCP connection, requiring the client to send a username to the FTP server;

after the username sent by the client is received, notifying an FTP state recording unit to update the FTP state as USER sent; and requiring the client to send a password to the FTP server, to wait for an acknowledgement packet from the FTP server and to parse whether login is successful;

after a user logs in successfully, recording the FTP state as successful establishment of the FTP control channel, updating the FTP state as successful establishment of the TCP connection for unsuccessful login, and requiring the user to perform login verification again;

parsing content of a Positive (PORT) command packet in the FTP control channel, and obtaining an Internet Protocol (IP) address and a port of a data channel;

establishing a dynamic data channel passing rule according to the IP address and the port of the data channel so as to allow the client and the FTP server to establish the data channel and transmit data while refusing passing of other packets not belonging to the data channel, and after transmission in the data channel, deleting the dynamic data channel passing rule;

parsing content of a Passive (PASV) command and a response packet of the PASV command, and obtaining an IP address and a port of a data channel;

establishing, according to the IP address and the port obtained from the response packet of the PASV command, a dynamic data channel passing rule to allow data transmission via the IP address and the port; and performing handshake detection for three times for a TCP packet of the data channel, tracking and detecting a TCP interaction process, recording a TCP state, and discarding transmission of a data packet not satisfying an interaction protocol.

* * * * *